Sept. 1, 1953  S. H. LICHTIG  2,650,448
FISHING LINE BRAKE
Filed March 26, 1951

INVENTOR.
SANFORD H. LICHTIG
BY
Fay & Fay
ATTORNEYS

Patented Sept. 1, 1953

2,650,448

UNITED STATES PATENT OFFICE 2,650,448

FISHING LINE BRAKE

Sanford H. Lichtig, Cleveland, Ohio

Application March 26, 1951, Serial No. 217,640

1 Claim. (Cl. 43—25)

This invention primarily relates to a fishing rod brake of resilient material adapted to be placed upon a fishing rod forward of the reel for retaining and braking a line therein against the drag of the line, plus the weight of the bait and sinker, if any.

More particularly, this invention relates to a device in the form of a line brake upon a tapered fishing rod to hold a line in a wedge clamp against the drag of the line while trolling or against the current while still fishing. This invention has a primary interest to alleviate the problem of thumbing the reel which is tedious, but not to reduce the effectiveness of the rod and reel in fishing. This brake is placed upon the rod forward of the reel and permits the line to be secured therein except under sudden pull, as when a fish takes the bait, and in this case a heavy drag is placed upon the line as the resiliently mounted brake cants in position on the rod.

An object of this invention is to provide a device which may be placed upon a fishing rod to hold the line therein against the pull of the line and bait while fishing while acting as a brake on the line under the action of a sudden pull until such time as the fisherman takes over.

A further object of this invention is to provide a resilient line brake which may be slipped upon the rod, either over the end or by a slot in the side of the line brake to fasten and brake the line while fishing.

A further object of the invention is to provide a resilient line brake which cants upon heavy loading to increase the drag applied to the line in the wedge action of the brake while preventing the cutting or fraying of the line at the same time.

To the accomplishment of the foregoing and related ends, said invention, then, consists of the means hereinafter fully described and particularly pointed out in the claim, the annexed drawing and the following description setting forth in detail certain mechanism embodying the invention, such disclosed means constituting, however, but one of the various mechanical forms in which the principle of the invention may be used.

In the drawings—

Figure 1:
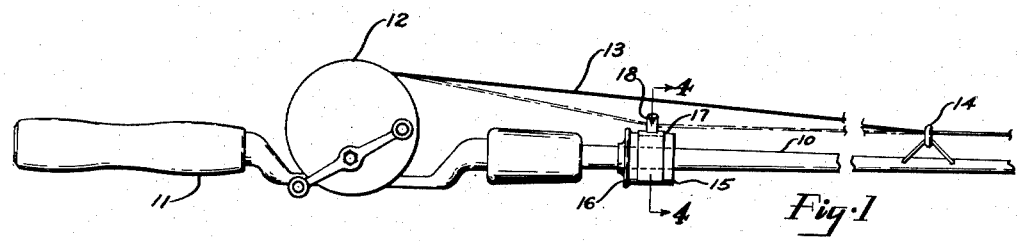
Fig. 1 is a partial elevational view of a fishing rod and reel showing the position of the line brake.
Figure 2:
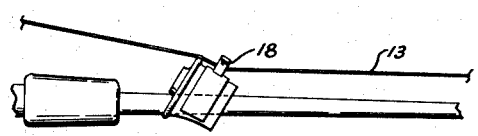
Fig. 2 is a partial view of the line brake when a sudden surge of the bait causes a sharp pull upon the line.
Figure 3:
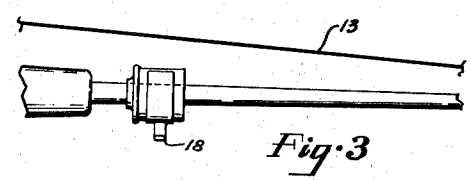
Fig. 3 is a further view of the line brake rotated upon the rod away from the immediate vicinity of the fishing line.

This invention is particularly designed for mounting upon a fishing rod designated as 10 in Fig. 1. This fishing rod has a handle 11, a reel 12 and a line 13 mounted on the reel which feeds through eyelets 14. The invention consists of a resilient bushing or mounting 15 either in the form of a full circle or a split circle mounted on the rod 10 which may have reinforcing members 16 of metal to strengthen the line holder. On one external face of the resilient bushing is a vertical projection 18 in the form of bifurcated arms which may be separated and are adapted to hold a line therein. This line brake may be pulled as shown in Fig. 2 and, depending upon the resilience of the mounting, will cant and tighten the line, increasing the drag when subjected to hard pulls, such as when a fish hits the bait. Fig. 3 shows the line brake rotated on the rod out of the immediate vicinity of the line 13 when, for example, its use is not required. Of course it should be appreciated that the resilient bushing mentioned above may be of rubber or other elastic material generally, or it may be of certain plastic materials which are sufficiently resilient for this use. The reinforcing members mentioned may be of metal or plastic whichever is preferred.

Figure 4:
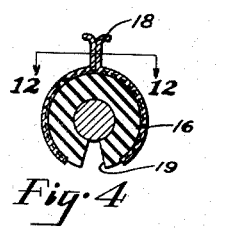
Fig. 4 is a cross-section along the line 4—4 of Fig. 1 showing one form of the line brake.

Fig. 4 is a cross-sectional view of the line brake showing the manner in which it is mounted upon the rod. In this modification the bushing of resilient material is split on the under side so that the holder may be inserted upon the rod after it has been assembled. The opening may, however, be on the side as well as on the bottom. In the case of one-piece rods it may be appreciated that this would be preferable since the bushings cannot be slipped upon the rod in those instances. The wedge 18 separates under tension and is adapted to hold a line under any pressure for which it may be designed and then slip. The edges of the wedge should be rounded, as shown at 26 in Fig. 12, in order to avoid the possibility of cutting the line as much as possible.

Figure 5:
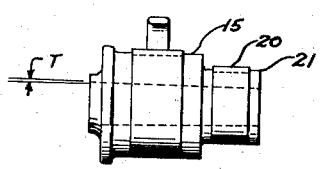
Fig. 5 is a side view of a modified form of the line brake showing a tapered internal bore.

Fig. 5 shows a modification wherein an additional band 20 of reinforcing material is mounted upon a shoulder 21 of the resilient bushing 15 to provide additional strength for the brake where the drag of the bait is particularly heavy. The other parts are the same as in the previous modifications. The internal bore of the bushing is tapered to adapt itself to fit the rod. It may be appreciated that in all instances it need not be tapered but under many circumstances this would be preferable.

Figure 6:
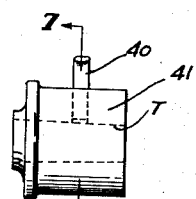
Fig. 6 is a side view of a further modification.
Figure 7:
Fig. 7 is a cross-sectional view along the line 7—7 of Fig. 6.

Fig. 6 shows a further modification of a line brake of the split bushing type in which no reinforcing member, such as reinforcing rings 17 and 20 of the other modifications are used. Here the wedge clamp 40 is formed by a single piece of metal bent in the shape of a return bend and mounted in the rubber bushing 41. The bore is tapered as in Fig. 5. Fig. 7 shows a cross-section of this construction.

Figure 8:
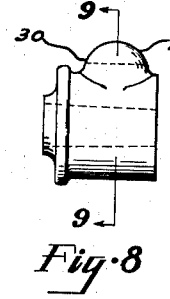
Fig. 8 is a side view of a further modification.
Figure 9:
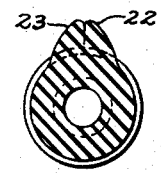
Fig. 9 is a cross-section along the line 9—9 of Fig. 8.

Fig. 8 shows a one-piece molded section having a pair of nodes on one external side of the cylindrical bushing, designated 22 and 23, to permit the line to be grasped therebetween. This line brake may be rotated upon the rod out of position as the previous types can be. The base may be tapered to fit the rod more securely. As the brake is subjected to a pull the brake cants and is grasped more firmly in the wedge on the reel side of the brake 30.

Figure 10:
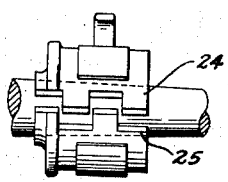
Fig. 10 is a side view of a line brake having a resilient bushing with dovetailing ends.

Fig. 10 shows a further type of brake in which the segmental resilient bushing has a split in the side of the rod and has a plurality of square sections which dovetail with the opposite side of the split bushing. Here it is seen that a tooth 24 is adapted to conform with a cut-away section 25 in the opposite circumferential edge of the bushing. It may be seen that these teeth could well be pyramidal in shape, or a plurality of undulations, and serve their function equally well. Though the split may be undulated, it can be straight and still have a firm holding power.

Figure 11:
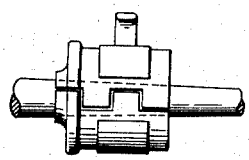
Fig. 11 shows a side view of a similar type of line brake on a smaller rod.

Fig. 11 shows a similar type construction upon a smaller rod and the manner in which the teeth fit into one another.

Figure 12:
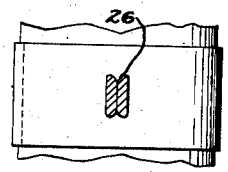
Fig. 12 is a cross-sectional view along the line 12—12 of Fig. 4 showing the type of openings for the wedge.

Fig. 12 shows a cross-sectional view of the wedge clamps with the end portions 26 being rounded to avoid cutting or fraying the line.

In operation this particular device has been found to be particularly effective when placed upon the line to retain it and to alleviate the attention of the operator to the need for thumbing the reel at all times. It can readily be appreciated that in trolling and in still fishing where the current is at all heavy, an ordinary reel will pay out unless a drag is placed upon the reel, as by thumbing. This is, of course, extremely tedious and it is not uncommon for a fisherman to have a sore thumb for days after fishing when this occurs unless he becomes accustomed to it. There are, of course, special reels made in which friction may be placed upon the reel. These are known as "star drag" reels and are not by any means common, but are in use. This invention attempts to alleviate the problem with a simple attachment, such as a line brake which may be placed upon the rod and resiliently attached thereto without marring or injuring the finish of the rod but retaining the line in the brake firmly, yet still permitting detachment therefrom as required. The braking action occurs automatically when a sudden surge occurs upon the line as, for example, when a fish takes the bait or when the bait strikes a snag. This device is particularly adapted to this problem because of the type of mounting in that the resilient material permits the line brake to cant a slight degree because of the wedge action. This increases the drag upon the line because the wedge tightens on the line.

A further important action of this particular line brake is the split feature which permits its ready attachment to the line even though the rod and reel may be assembled. The split may be on the side or bottom. This alleviates the problem of disassembly and permits its attachment, as for example, when a current should drag the bait away and the fisherman does not care to thumb the reel to prevent this. It should be appreciated that it may be in the form of a full cylinder when the handle and the first section may be disassembled, thus the bushing and line brake may be inserted upon the rod when needed. The action above described is approximately the same in each instance. A particular advantage of the split type line brake is that it may be quickly removed from the rod when required and will not get in the path of the line going to the reel.

I wish it to be understood that I do not confine myself to the precise details herein set forth in the preferred means of carrying out my invention as it is apparent that many changes and variations may be made by those skilled in the art without departing from the spirit of the invention or exceeding the scope of the appended claim.

I claim:

A line brake for a fishing rod comprised of a resilient unitary cylinder member, having a coextensive cylinder bore corresponding in diameter substantially to the diameter of the fishing rod upon which it is to be placed, and a projection extending outwardly from said exterior surface of the cylinder, said projection being slit in a plane passing through the axis of the bore whereby a line supported by said rod may be retained within the slit.

SANFORD F. LICHTIG.

References Cited in the file of this patent

UNITED STATES PATENTS

| Number | Name | Date |
|---|---|---|
| 664,889 | Ogimura | Jan. 1, 1901 |
| 2,225,472 | Franklin | Dec. 27, 1940 |
| 2,296,174 | Meisler | Sept. 15, 1942 |
| 2,601,839 | Kucewicz | July 1, 1952 |

FOREIGN PATENTS

| Number | Country | Date |
|---|---|---|
| 596,851 | France | Aug. 17, 1925 |